UNITED STATES PATENT OFFICE.

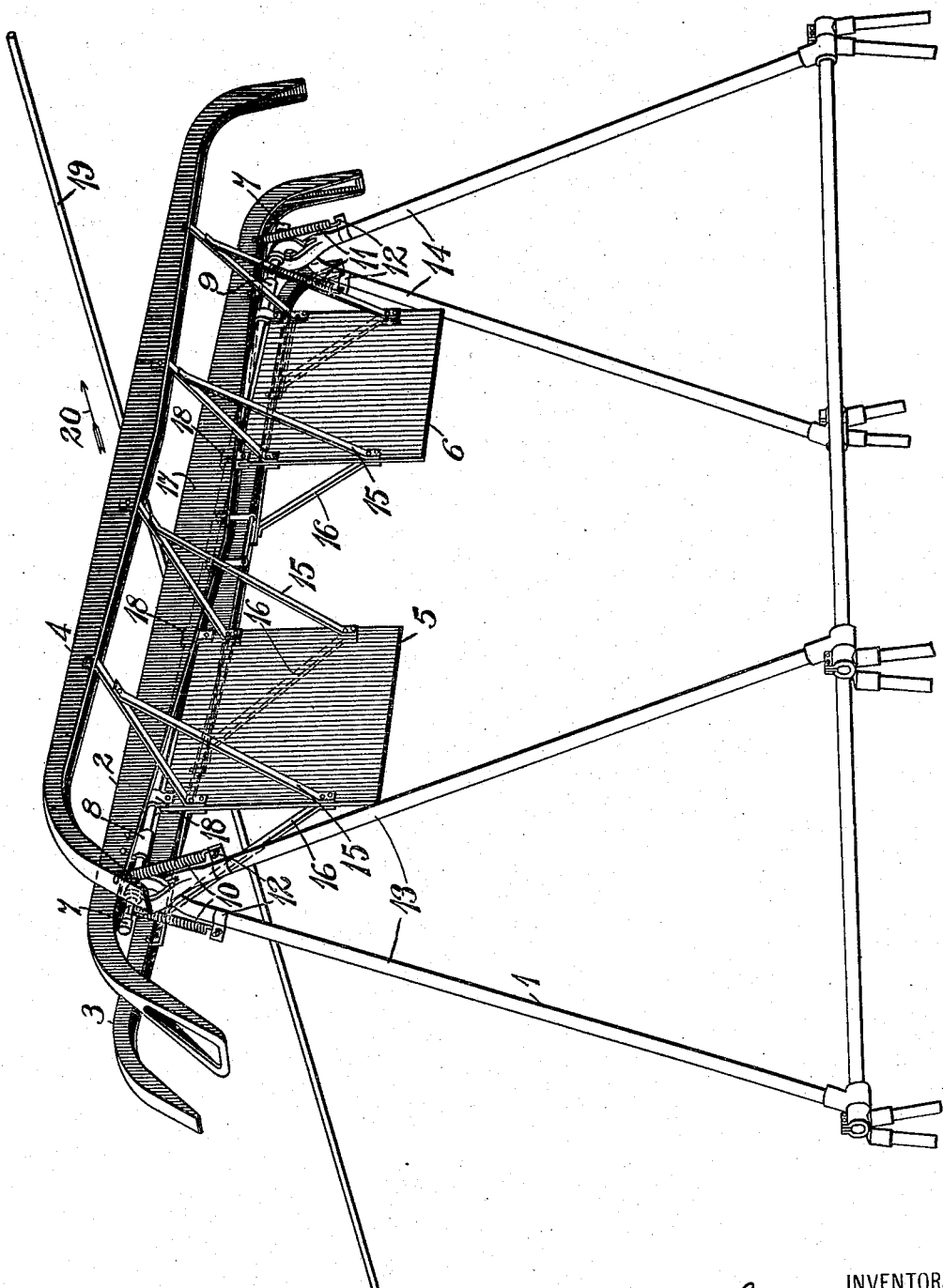

THEODORE VARNEY AND NORMAN W. STORER, OF PITTSBURG, PENNSYLVANIA, ASSIGNORS, BY MESNE ASSIGNMENTS, TO WESTINGHOUSE ELECTRIC & MANUFACTURING COMPANY, OF EAST PITTSBURG, PENNSYLVANIA, A CORPORATION OF PENNSYLVANIA.

TROLLEY FOR ELECTRIC VEHICLES.

932,519.  Specification of Letters Patent.  Patented Aug. 31, 1909.

Application filed May 23, 1908. Serial No. 434,626.

*To all whom it may concern:*

Be it known that we, THEODORE VARNEY and NORMAN W. STORER, citizens of the United States, and residents of Pittsburg, in the county of Allegheny and State of Pennsylvania, have invented a new and useful Improvement in Trolleys for Electric Vehicles, of which the following is a specification.

Our invention relates to trolleys for electrically propelled vehicles and it has for its object to provide a simple and durable device of this character that shall be specially adapted to transmit large amounts of electric power from a stationary line conductor to a vehicle operating at a high speed.

Spring pressure has usually been exerted upon the supporting frames of trolley structures to hold the contact members in engagement with the supply conductors, but, on account of the inertia of the moving parts and the unavoidable irregularities in the suspension of the supply conductors, the contact members tend, particularly at high speeds, to become temporarily separated from the supply conductors.

According to our present invention, we provide means for increasing the pressure between the contact member and the conductor, as the speed of the vehicle increases, in order to insure a continuous electrical connection between the engaging parts and to avoid formation of electric arcs.

Since sliding or bow trolleys are considered preferable to other types for high speed service where relatively large amounts of power are transmitted from the supply line to the vehicle, we have illustrated our improvement in connection with a trolley of this type although its application is not restricted in this regard and it may be readily adapted to other well known types of current collectors by those skilled in the art.

The single figure of the accompanying drawing is a perspective view of a trolley embodying our invention and provided with means for increasing the pressure between the contact members and the supply conductor, in accordance therewith.

Referring to the drawing, the device here illustrated comprises a frame or supporting structure 1 which is in the form of a double pantograph or lazy tongs, a main bow contact shoe 2 supported at the upper end of the frame 1, a pair of auxiliary contact shoes 3 and 4 and wind-vanes 5 and 6 for varying the pressure between the one or the other of the auxiliary contact shoes and the supply conductor, according to variations in the speed and direction of travel of the vehicle.

The supporting frame 1 comprises a plurality of rods or tubes combined to form two pantographs, in parallel planes, which are pivotally secured to the top of a vehicle in a well known manner. The upper extremities of the pantographs are connected by a rod or shaft 7 upon which the main contact shoe 2 is rotatably supported by sleeve projections 8 and 9, and the upper surface of this contact shoe is held substantially in a horizontal plane by springs 10 and 11 which are interposed between opposite points of the sides of the main shoe and projections 12 from side rods 13 and 14 of the pantographs.

The wind-vanes 5 and 6 are preferably metal sheets or plates that are rotatably mounted upon and suspended from the rod 7 between the sleeves 8 and 9. The auxiliary contact shoes 3 and 4 are supported by brackets 15 and 16 which are fastened to opposite sides of the wind-vanes 5 and 6, the arrangement of parts being such that when the main contact shoe is in engagement with a substantially horizontal line conductor, either one of the auxiliary shoes may be moved into engagement with the conductor by rotating the vanes through relatively small angles from the vertical. When the trolley, as a whole, is lowered out of engagement with the trolley conductor, the rotative movement of the structure, comprising the auxiliary shoes and the wind-vanes, is limited by side plates 17 of the main contact shoe which are engaged by loops 18 that surround the rod 7 and serve to hold the wind-vanes in position.

The operation of the device is as follows: Assuming that the main contact member is held in engagement with an overhead trolley conductor 19 and that the vehicle to which the trolley is secured is moved in the direction indicated by the arrow 20, the wind pressure which will be exerted against the front surfaces of the wind-vanes 5 and 6 tends to rotate the auxiliary contact shoe 3 into engagement with the supply conductor. The pressure exerted by the auxiliary shoe against the conductor will obviously be dependent upon the speed of the vehicle, by reason of the increased wind pressure exerted on the vanes under high speed conditions. If the vehicle is operated in the opposite direction, the auxiliary contact shoe 4 will be forced into engagement with the trolley conductor, in a similar manner to that above described. The frame structure comprising the wind-vanes and the auxiliary contact shoes is preferably composed of aluminum parts in order that its weight and inertia may be small. If the main contact shoe becomes slightly separated from the conductor, one of the auxiliary shoes will maintain its contact with the conductor and electric arcs, which would otherwise be formed, will be thus avoided. We prefer to use a supporting structure similar to that shown and described in a co-pending application, Serial No. 296,318, filed by Theodore Varney.

If desired, the rod 7, from which the wind-vane structure is supported may be replaced by two short lengths of rod, one at each end of the shoe, the vanes being attached directly to the main contact shoe. It is also to be understood that various other structural modifications may be effected within the spirit and scope of our invention, and we desire that only such limitations shall be imposed as are indicated in the appended claims.

We claim as our invention:

1. A trolley for electric vehicles having a plurality of contact members and a wind-vane for adjusting certain of said members.

2. A trolley for electric vehicles having a main contact member, auxiliary contact members located at the sides of the main contact member, and a wind-vane for rendering the respective auxiliary contact members active.

3. In an electric vehicle, the combination with a supply conductor, a trolley having a main contact member, and auxiliary contact members, of one or more wind-vanes dependent upon the speed of the vehicle for forcing an auxiliary contact member into engagement with the conductor.

4. In an electric vehicle, the combination with a supply conductor, a trolley comprising a pantograph or lazy tongs structure, a main bow contact shoe supported at the upper end of the structure, and auxiliary contact shoes, of means dependent upon the speed of the vehicle for forcing an auxiliary contact shoe into engagement with the conductor.

5. In an electric vehicle, the combination with a trolley comprising a pantograph or lazy tongs structure, a main bow contact shoe supported at the upper end of the structure, and auxiliary contact shoes, of one or more wind-vanes dependent upon the speed and direction of the vehicle for forcing the one or the other of the auxiliary contact shoes into engagement with the conductor.

6. A trolley for electric vehicles comprising a double pantograph supporting frame structure, a cross rod or shaft at the top of the structure, a main bow contact shoe rotatably mounted on the cross rod and an auxiliary structure comprising wind-vanes suspended from the cross rod, and auxiliary contact shoes supported by the wind-vanes.

In testimony whereof, we have hereunto subscribed our names this 16th day of May, 1908.

THEODORE VARNEY.
NORMAN W. STORER.

Witnesses:
BIRNEY HINES,
T. H. SCHOEPF.